United States Patent
Kawahara et al.

(10) Patent No.: US 6,370,324 B1
(45) Date of Patent: Apr. 9, 2002

(54) DIGITAL INFORMATION RECORDER/REPRODUCER WITH ECC ENCODING OF COMPRESSED SIGNAL AND SELECTIVE BYPASS OF ECC ENCODING

(75) Inventors: Minoru Kawahara; Kenji Yamasaki, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/200,699

(22) Filed: Nov. 27, 1998

Related U.S. Application Data

(63) Continuation of application No. PCT/JP98/01381, filed on Mar. 27, 1998.

(30) Foreign Application Priority Data

Mar. 31, 1997 (JP) ................................ 9-081298
Mar. 27, 1998 (WO) ................................ PCT/JP98/01381

(51) Int. Cl.⁷ ................................ H04N 7/26
(52) U.S. Cl. ................ 386/109; 386/46; 386/109; 386/52; 348/705; 358/906
(58) Field of Search ............. 386/98, 46, 52, 386/55, 117, 113, 109, 112; 348/705; 358/906, 909.1

(56) References Cited

U.S. PATENT DOCUMENTS 5,367,341 A * 11/1994 Schnorf ................ 348/616
5,493,414 A * 2/1996 Inoue et al. ............ 386/52
5,572,254 A * 11/1996 Kawahara ............... 348/222
5,689,611 A * 11/1997 Ohta et al. .............. 386/46
5,790,556 A * 8/1998 Matsumoto ............. 370/527
6,044,198 A * 3/2000 Otaka et al. ............ 386/98

FOREIGN PATENT DOCUMENTS

JP          06350965 A   * 12/1994  ............ H04N/5/92

* cited by examiner

Primary Examiner—Vincent F. Boccio
(74) Attorney, Agent, or Firm—Frommer Lawrence & Haug LLP; William S. Frommer

(57) ABSTRACT

A signal reproduced from an ADV head, which is advanced a recording head is error corrected in the ECC decoder. The compression encoding process is decompressed in the compression decoder. The output signal of the ECC decoder is input to the selector. A reproduction signal of the CNF head reproducing a recording data just after recording is supplied to a selector through a ECC decoder and a compression decoder. A bypass signal from the ECC encoder of the recording side is supplied to the the ECC decoder as it's another input. In the ECC decoder, two types of data are written to two different areas of the memory. One of the data is read out selectively and supplied to the selector. The selector is switched from the output of the ADV head to the bypass signal at an in-point. The preview operation can be attained by the picture that has been compressed and decompressed.

7 Claims, 14 Drawing Sheets

Fig. 13

BANK B

| | | |
|---|---|---|
| S0-DATA110 | S0-DATA111 | 0 |
| S1-DATA110 | S1-DATA111 | 1 |
| S2-DATA110 | S2-DATA111 | 2 |
| S3-DATA110 | S3-DATA111 | 3 |
| S0-DATA112 | S0-DATA113 | 4 |
| S1-DATA112 | S1-DATA113 | 5 |
| S2-DATA112 | S2-DATA113 | 6 |
| S3-DATA112 | S3-DATA113 | 7 |
| S0-DATA114 | S0-DATA115 | 8 |
| S1-DATA114 | S1-DATA115 | 9 |
| S2-DATA114 | S2-DATA115 | 10 |
| S3-DATA114 | S3-DATA115 | 11 |
| ⋮ | ⋮ | ⋮ |
| S0-DATA216 | S0-ID2 | 220 |
| S1-DATA216 | S1-ID2 | 221 |
| S2-DATA216 | S2-ID2 | 222 |
| S3-DATA216 | S3-ID2 | 223 |
| S0-Err112~127 | | 224 |
| S1-Err112~117 | | 225 |
| S2-Err112~117 | | 226 |
| S3-Err112~117 | | 227 |
| ⋮ | | ⋮ |
| S0-Err208~216 | | 248 |
| S1-Err208~216 | | 249 |
| S2-Err208~216 | | 250 |
| S3-Err208~216 | | 251 |

BANK A

| | | |
|---|---|---|
| S0-ID0 | S0-ID1 | 0 |
| S1-ID0 | S1-ID2 | 1 |
| S2-ID0 | S2-ID3 | 2 |
| S3-ID0 | S3-ID4 | 3 |
| S0-DATE0 | S0-DATA1 | 4 |
| S1-DATE0 | S1-DATA1 | 5 |
| S2-DATE0 | S2-DATA1 | 6 |
| S3-DATE0 | S3-DATA1 | 7 |
| S0-DATE2 | S0-DATA3 | 8 |
| S1-DATE2 | S1-DATA3 | 9 |
| S2-DATE2 | S2-DATA3 | 10 |
| S3-DATE2 | S3-DATA3 | 11 |
| ⋮ | ⋮ | ⋮ |
| S0-DATE108 | S0-DATA109 | 220 |
| S1-DATE108 | S1-DATA109 | 221 |
| S2-DATE108 | S2-DATA109 | 222 |
| S3-DATE108 | S3-DATA109 | 223 |
| S0-Err0~15 | | 224 |
| S1-Err0~15 | | 225 |
| S2-Err0~15 | | 226 |
| S3-Err0~15 | | 227 |
| ⋮ | | ⋮ |
| S0-Err96~111 | | 248 |
| S1-Err96~111 | | 249 |
| S2-Err96~111 | | 250 |
| S3-Err96~111 | | 251 |

COLUMN ADDRESS

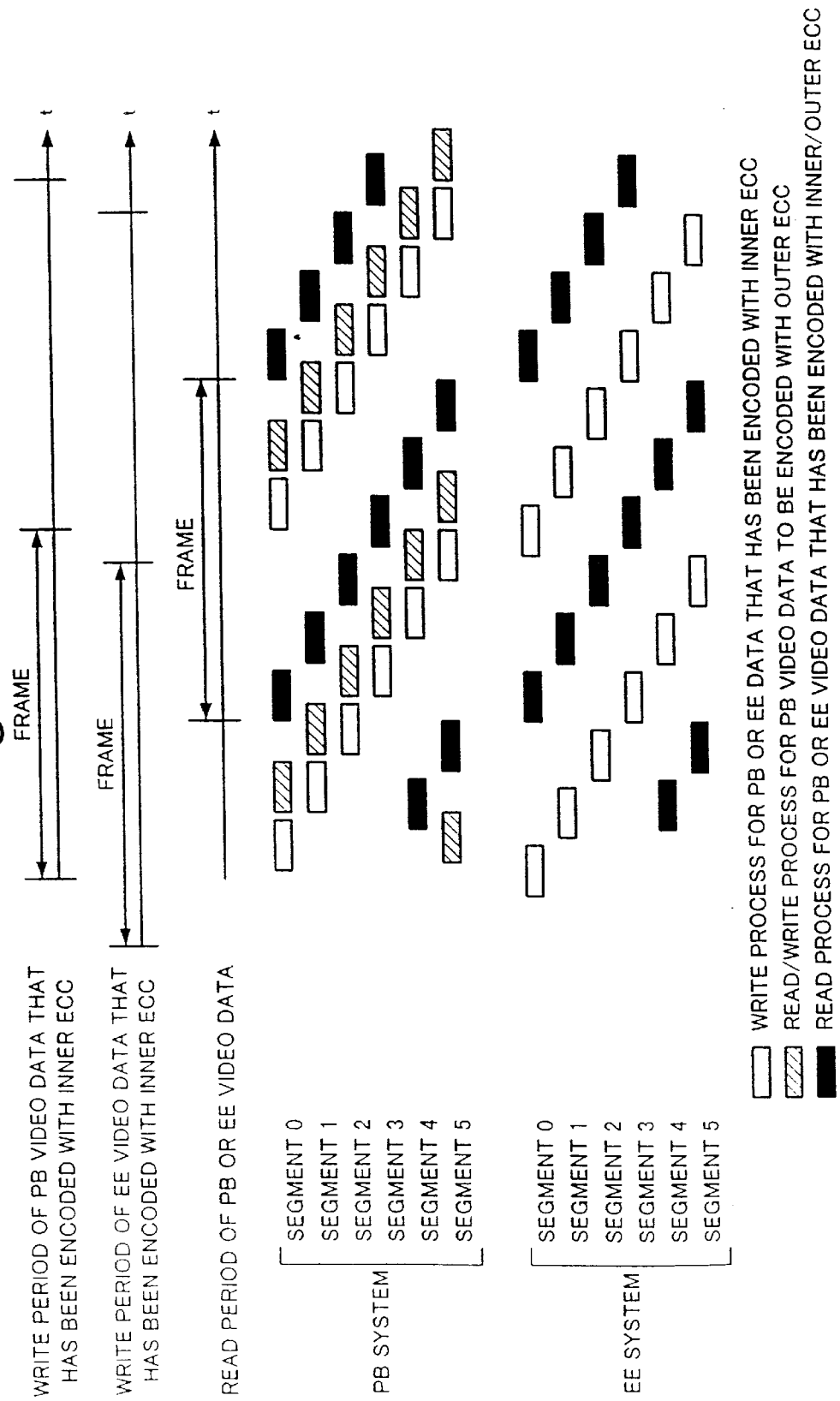

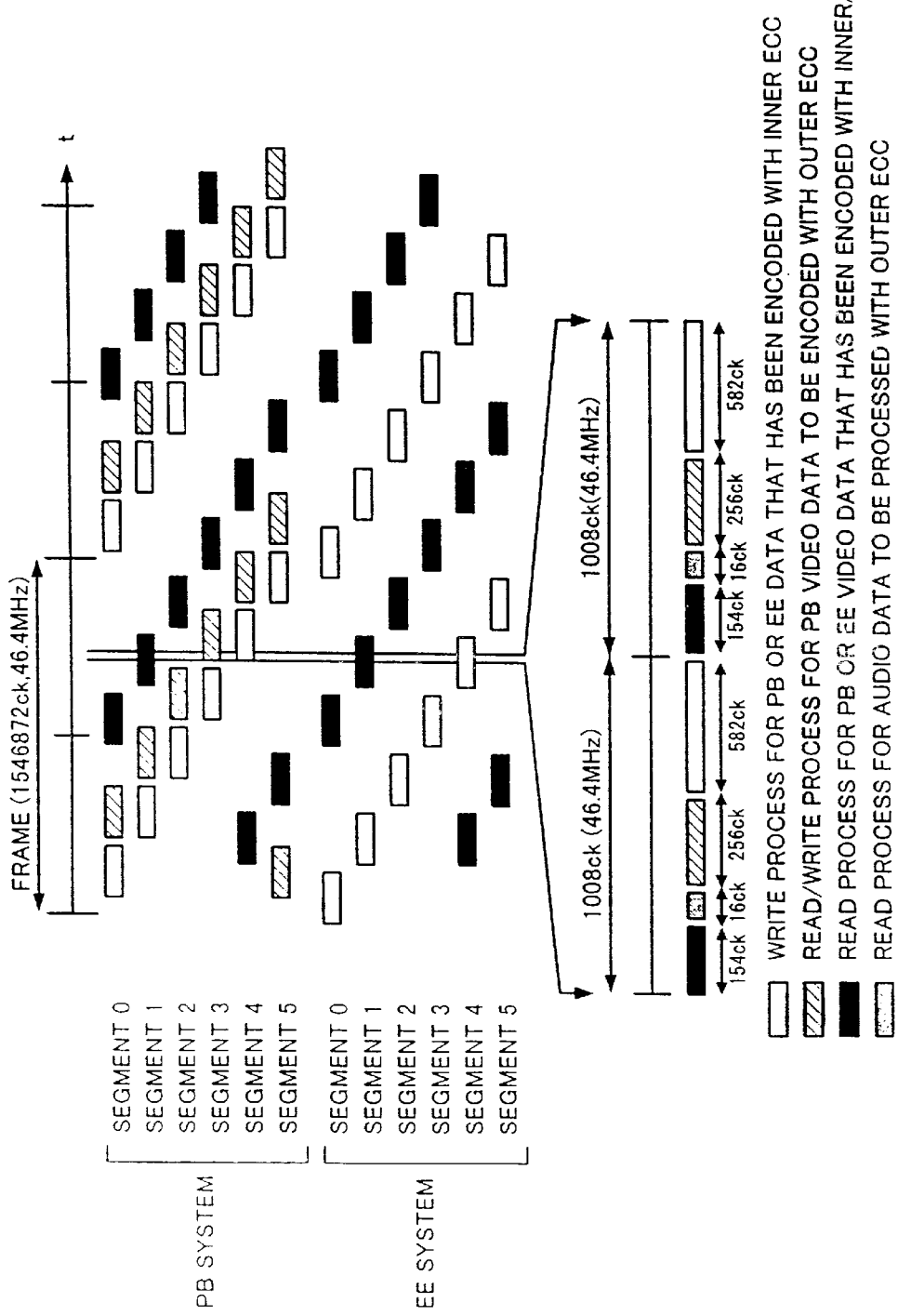

DIGITAL INFORMATION RECORDER/REPRODUCER WITH ECC ENCODING OF COMPRESSED SIGNAL AND SELECTIVE BYPASS OF ECC ENCODING

This is a continuation of copending International Application PCT/JP98/01381 having an international filing date of Mar. 27, 1998.

TECHNICAL FIELD

The present invention relates to a digital information signal recording/reproducing apparatus for recording a digital information signal (for example, a digital video signal) to a record medium and for reproducing a digital video signal from a record medium and to a method thereof.

BACKGROUND ART

A signal processing apparatus used in a digital VTR (Video Tape Recorder) that records/reproduces a video signal (for example, a high resolution video signal) compresses an input video signal so as to decrease the data amount and data rate of a signal to be recorded/reproduced. The compressed video signal is encoded with an error correction code and then recorded to for example a video tape. On the other hand, a signal reproduced from a video tape is decoded with an error correction code, decompressed, and output as a reproduced video signal. As an error correction code, a product code for dually encoding a predetermined number of data words with an inner code and an outer code is used.

When an editing operation is performed with a digital VTR, to check out the edited result, the user normally performs a preview operation. In the conventional digital VTR, to perform the preview operation, an input video signal to be inserted is switched from a signal reproduced from a tape at an edit point. To perform the preview operation, the user checks out the resultant video signal with a monitor.

FIG. 1 is a block diagram showing the structure of a conventional system that performs the preview operation. Referring to FIG. 1, reference numeral 1 is a compression code encoder. Reference numeral 2 is an ECC encoder that encodes the compressed signal with an error correction code. An output signal of the ECC encoder 2 is sent to recording heads through a recording driver and so forth. The recording heads record the signal received from the ECC encoder 2 as diagonal tracks on a magnetic tape. The recording heads are disposed on a rotating drum. In addition, reproducing heads are disposed on the rotating drum. There are two types of reproducing heads that are an advanced reproducing head (ADV head) disposed at an advanced position of a recording head in the rotating direction of the rotating drum and a reproducing head (CNF head) disposed just after the recording head.

With the ADV head, a normal reproducing operation is performed. With the ADV head, a video data recorded on a tape and video data that is input from the outside are synchronized so as to insert a material into data that has been recorded. This operation is referred to as insert editing operation. On the other hand, in the state that recorded data is erased with a full erase head and new data is recorded, with the CNF head, data recorded by a recording head is immediately read so that the user can check out the recorded data.

In FIG. 1, a signal ADV PB RF reproduced by an ADV head is sent to an inner code decoder 3 that corrects an error of the signal with an inner code. An output signal of the inner code decoder 3 is sent to an outer code decoder 5 that corrects an error of the signal with an outer code. The inner code decoder 3 is connected to a RAM 4. Output data of the inner code decoder 3 is written to the RAM 4. The RAM 4 arranges the written data in an outer code sequence. Likewise, the outer code decoder 5 is connected to a RAM 6. Output data of the outer code decoder 5 is written to the RAM 6. The RAM 6 arranges the written data in an inner code sequence. Output data of the inner code decoder 3 is sent to a compression code decoder 7.

Likewise, a signal CNF PB RF reproduced from an CNF head is error-corrected with an inner code by an inner code decoder 9 and a RAM 10. The resultant data is error-corrected with an outer code by an outer code decoder 11 and a RAM 12. The decoders 9 and 11 are connected to the RAMs 10 and 12, respectively. The RAMs 10 and 12 arrange the orders of data. Output data of the decoder 11 is sent to the compression code decoder 7. The compression code decoder 7 selectively decompresses output data of the outer code decoder 5 or output data of the outer code decoder 11 corresponding to the operation mode (recording mode or reproducing mode) of the VTR and outputs a reproduced video signal.

Reproduced signal received through the path of the inner code decoder 3, the outer code decoder 5, and the compressing decoder 7 (PB system) and recorded video data that is received through a path of an EE system are sent to a selector 8. The selector 8 switches video data corresponding to an external control signal. When the insert editing operation is performed and the edited data is previewed, the selector 8 outputs a video signal received through the EE system in a period between an in-point and an out-point. On the other hand, the selector 8 outputs a PB signal in the other period.

FIG. 2 is a timing chart showing an insert editing operation or a preview operation for the edited result performed by the system shown in FIG. 1. FIG. 2 shows the relation of frames of an input video signal and other signals assuming that the input video signal takes place at frame 0. In FIG. 2, a signal for one frame is represented by a rectangle that is nearly the same as the period of one frame. In addition, six equal portions into which one frame is divided represent six segments of compressed data.

A reproduced signal of an ADV head is processed by the inner code decoder 3. The inner code decoder 3 outputs data that has a delay to the output signal of the ADV head by one segment. The outer code decoder 5 corrects an error of the data with an outer code and outputs data that has a delay for a time period of the process thereof. The compression decoder 7 decompresses output data of the outer code decoder 7 and outputs a reproduced video signal that has a delay to the output data of the outer code decoder 5 by one fame. A reproduced video signal is a signal at frame 0. When the reproduced video signal is sent to the selector 8, the reproduced video signal synchronizes with an input video signal received through the EE system. The selector 8 selects an output video signal. A monitoring operation of an output signal of the selector 8 is referred to as preview operation. On the other hand, the operation for switching the reproducing mode to the recording mode and for overwriting the output video signal on a signal that has been recorded on a tape is referred to as insert editing operation.

On the other hand, the input video signal is compressed by the compression code encoder 1. Thus, the compression code encoder 1 outputs a signal that has a delay to the input video signal by one frame. The ECC encoder 2 encodes an output signal of the compression code encoder 1 with a product code and outputs a signal that has a delay to the output signal of the compression code encoder 1 by a time period of the process of the ECC encoder 2. The output signal of the ECC encoder 2 is recorded to a tape by a recording head. The recorded signal is reproduced with a delay of around 0.5 segment by a CNF head.

In the above-described conventional digital VTR, when the preview operation is performed, the following problems take place.

1. In the period between an in-point and an out-point, only a signal that is bypassed (namely, a signal that is received through the EE system) is output. Thus, the user cannot preview a picture that has been compressed. Only a compressed video signal is recorded. The compressing process causes the picture quality of a picture to deteriorate. Although the preview operation is performed to check out the edited result, since the user cannot preview a picture that has not been compressed, the primary objective of the preview operation cannot be satisfactorily attained.

2. While the editing operation is being performed, just before an in-point takes place, the system cannot determine which of the preview operation or the editing operation is being performed. Thus, to allow the system always to handle the preview operation, a signal reproduced by an ADV head should be output until an in-point takes place. Otherwise, since the input video signal does not synchronize with the reproduced video signal, the preview operation cannot be performed. On the other hand, while the editing operation is being performed, to allow the user to preview a picture recorded on a tape, a signal reproduced by a CNF head should be output. However, even if the system is designed to perform the editing operation at an in-point, the system cannot switch a, signal reproduced by the ADV head to a signal reproduced by the CNF head at once. This is because a CNF head reproduces a signal recorded by a recording head. The phase of the reproducing system of the CNF head is completely different from the phase of the reproducing system of the ADV head. If the reproducing system of the ADV head is forcedly switched to the reproducing system of the CNF head regardless of the difference of these phases, a reproduced picture instantaneously disappears due to the phase difference. Thus, while the user is performing the preview operation, he or she cannot perform the editing operation.

3. Regardless of the editing operation, when an input picture is compressed, the user may want to check out the deterioration of the picture quality with the EE system. However, in the above-described structure, since there is no signal path that allows compressed data to be returned to the reproducing system, such necessity cannot be satisfied.

DISCLOSURE OF INVENTION

Therefore, an object of the present invention is to provide a digital information signal recording/reproducing apparatus that allows the above-described problems of the conventional digital VTR to be solved and to a method thereof.

A first aspect of the present invention is a digital information signal recording/reproducing apparatus for recording a digital information signal to a record medium and for reproducing a digital information signal from a record medium, comprising a recording signal path having a compression code encoding means for compressing an input digital information signal, and an error correction code encoding means for encoding a compressed signal received from the compression code encoding means with an error correction code, a recording means for recording a signal received through the recording signal path to a record medium, a reproducing means for reproducing a signal from the record medium, a reproducing signal path having an error correcting means for receiving a reproduced signal from the reproducing means and decoding the reproduced signal that has been encoded with the error correction code, and a compression code decoding means for receiving an output signal of the error correcting means and decompressing the received signal, a bypass signal path connected from an output of the compression code encoding means to an input of the compression code encoding means, and a selecting means for selecting a signal received from the reproducing signal path or a signal received from the bypass signal path and for outputting the selected signal.

The error correcting means has an input portion for the reproduced signal, and an input portion for a bypass signal received from the bypass signal path. The bypass signal path is disposed from an output of the error correction code encoding means to an input of the error correcting means.

The error correcting means has a memory for changing the order of signals. The reproduced signal and the bypass signal are assigned different addresses of the memory and written to the respective addresses.

One of the reproduced signal and the bypass signal is selectively read from the memory. The phase of the reproduced signal is matched with the phase of the bypass signal so that the phase difference therebetween becomes 0.

A second aspect of the present invention is a digital information signal recording/reproducing method for recording a digital information signal to a record medium and for reproducing a digital information signal from a record medium, comprising the steps of (a) performing a record signal process for compressing an input digital information signal and encoding the compressed signal with an error correction code, (b) recording a signal processed at step (a) to a record medium, (c) reproducing a signal from the record medium, (d) performing a reproduction signal process for decoding the reproduced signal that has been encoded with the error correction code and decompressing the received signal, (e) bypassing the decompressed signal to a compression code decoding process, and (f) selecting a signal processed at step (d) or a signal that has been bypassed.

BRIEF DESCRIPTION OF DRAWINGS

FIG. 13 is a schematic diagram showing an example of column addresses assigned to the external RAM connected to the error correction code decoder IC;

FIG. 14 is a timing chart for explaining an access operation of the external RAM connected to the error correction code decoder IC; and FIG. 15 is a timing chart for explaining a time division operation of the external RAM connected to the error correction code decoder IC.

BEST MODE FOR CARRYING OUT THE INVENTION

Figure 1:
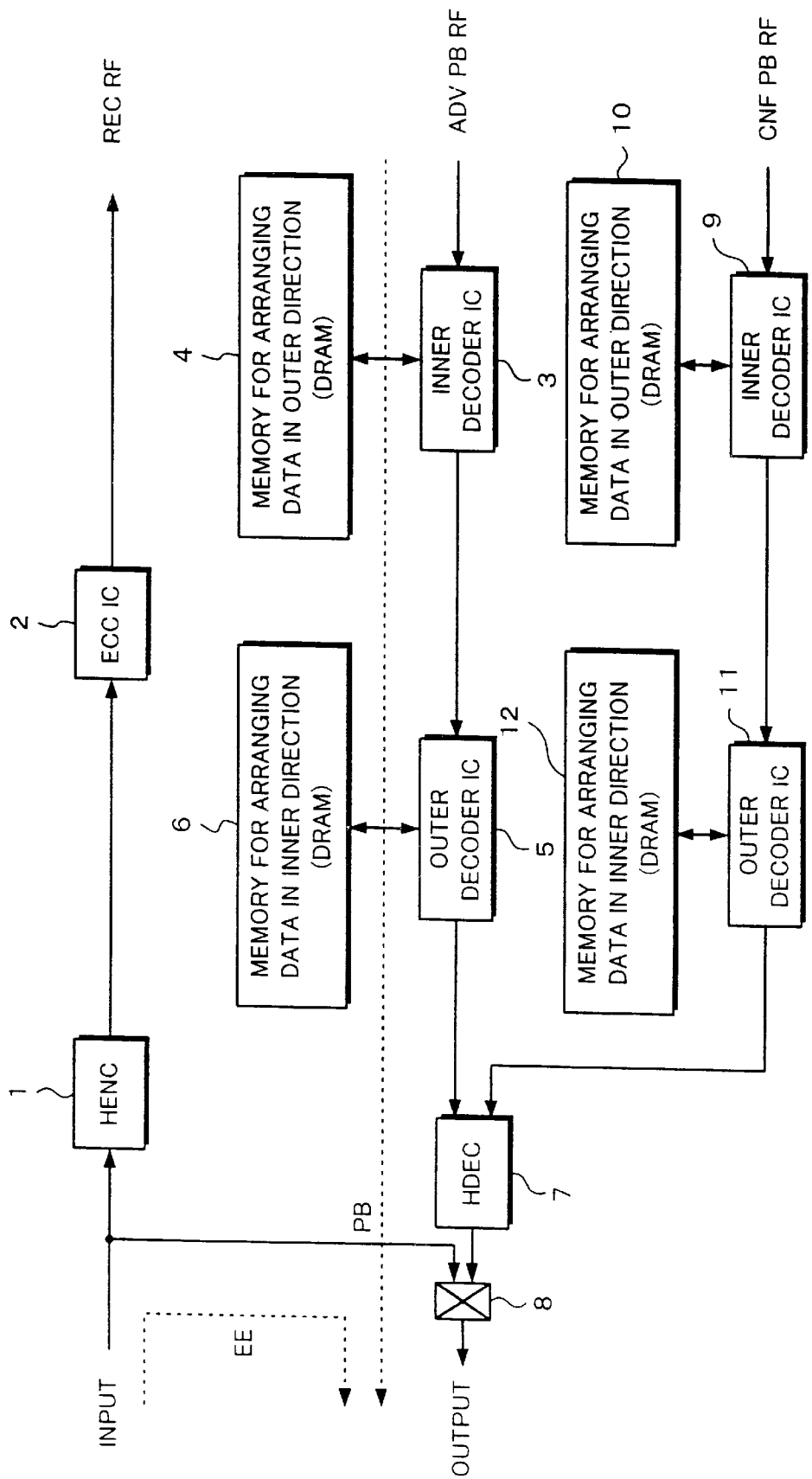
FIG. 1 is a block diagram showing an example of the structure for a preview operation of a conventional digital VTR.
Figure 2:
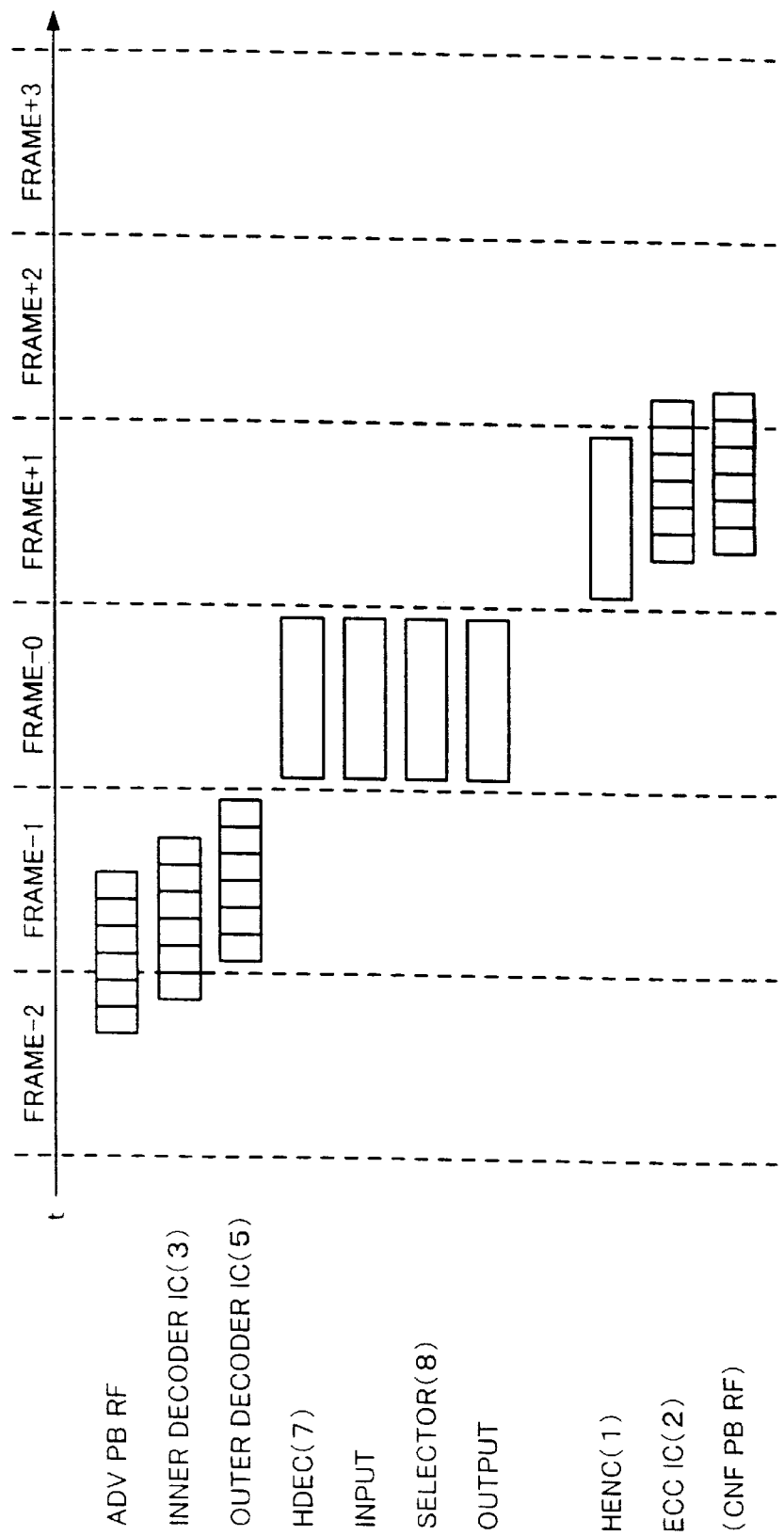
FIG. 2 is a timing chart for explaining the preview operation of the conventional digital VTR.
Figure 3:
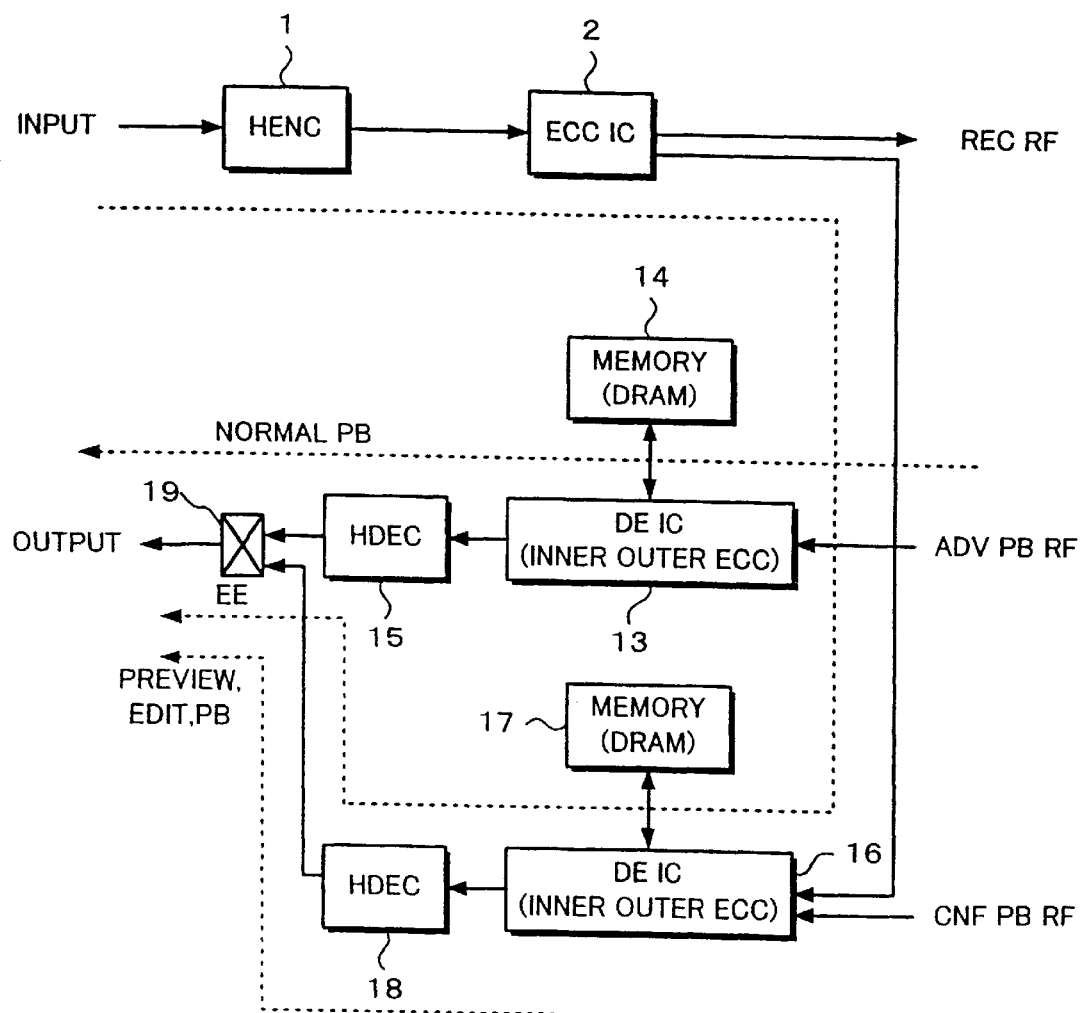
FIG. 3 is a block diagram showing an example of the structure of principal portions according to an embodiment of the present invention.

Next, an embodiment of the present invention will be described. First of all, with reference to FIG. 3, a feature of the structure of the present invention (namely, the structure of a system for the preview operation) will be described. Reference numeral 1 is a compression code encoder. Reference numeral 2 is an ECC encoder that encodes an output signal of the compression code encoder 1 with an error correction code (product code). An output signal of the ECC encoder 2 is sent to a recording head through a recording driver and so forth and recorded as a diagonal track on a magnetic tape. Recording heads are disposed on a rotating drum. In addition, reproducing heads are disposed on the rotating drum. There are two types of reproducing heads that are an ADV head and a CNF head. The ADV head is disposed at an advanced position of a recording head in the rotating direction of the rotating drum. The CNF head is disposed just after the recording head.

The ADV head is used for the normal reproducing operation. In addition, with the ADV head, the inert editing operation for causing the reproduced data to synchronize with the input video data and for inserting the input video data in data that has been recorded is performed. The CNF head is used to immediately read data recorded by the recording head and check out whether or not data has been normally recorded while the recording operation is being performed. In the embodiment of the present invention, while the editing operation is being performed, a signal reproduced from the CNF head is used.

A signal ADV PB RF reproduced from an ADV head is sent to an ECC decoder 13. The ECC decoder 13 is an IC that processes the signal ADV PB RF with an inner code and an outer code. The IC of the ECC decoder 13 is connected to an external memory (DRAM) 14. The memory 14 changes the order of data. Output data of the ECC decoder 14 is sent to a compression code decoder 15. The ADV head has a DT (Dynamic Tracking) function. In contrast, the CNF head does not have the DT function. The DT function causes the vertical position of a head to be controlled so that the head precisely scans a track on the tape. Thus, the ADV head reproduces a signal with a higher S/N ratio than a signal that the CNF head reproduces. When the tape is stopped or a special reproducing operation for varying the tape speed from the tape speed of the recording operation is performed, the ADV head can scan a track. A signal reproduced by the ADV head with the DT function is used as a normal reproduced signal.

A signal CNF PB RF reproduced by the CNF head is sent to an ECC decoder 16. The ECC decoder 16 corrects an error of the signal CNF PB RF. The ECC decoder 16 is connected to an external memory 17. Output data of the ECC decoder 16 is sent to a compression code decoder 18. The ECC decoder 16 can receive signals from two systems. The data CNF PB RF is sent to a first input of the ECC decoder 16. Output data of the ECC encoder 2 is sent to a second input of the ECC decoder 16.

As will be described later, the ECC decoder 16 writes the two types of input data to two different areas of the memory 17. When data is read from the ECC decoder 16, one type of data is selectively read from the memory 17. Reproduced video signals that are output from the compression code decoders 15 and 18 are sent to a selector 19. The selector 19 selects one type of data received from the compression code decoders 15 and 18 and outputs the selected data as a reproduced video signal.

The normally reproduced video signal received through the PB system including the compression code decoder 15 and the signal received through the ECC decoder 16 and the compression code decoder 18 (namely, the EE system or CNF PB system) is sent to the selector 19. The selector 19 selects one of output data of the normal PB system and output data of the compression code decoder 18 corresponding to an external control signal. In other words, while the editing operation or the preview operation is being performed, output data of the compression code decoder 18 is selected. An output signal of the selector 19 is an output video signal. When the input signal is switched between the CNF PB system (or CNF system) and the EE system by the ECC decoder 16, the operation is switched between the editing operation and the preview operation.

Figure 4:
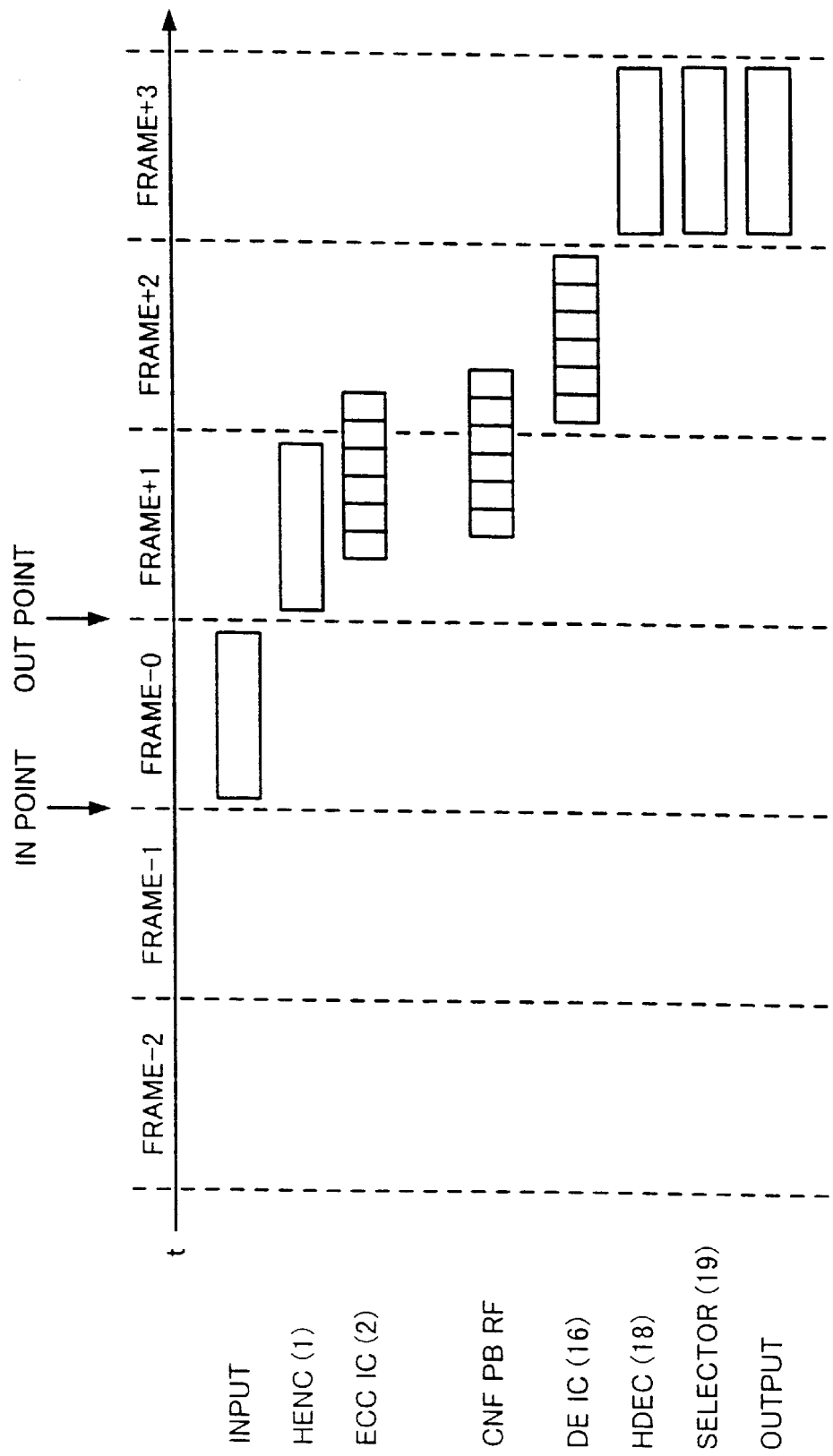
FIG. 4 is a timing chart for explaining the operation of the principal portions of the embodiment of the present invention.

FIG. 4 is a timing chart showing processes for an insert editing operation and a preview operation according to the present invention. FIG. 4 shows the relation of frames of an input video signal and other signals assuming that the input video signal takes place at frame 0. In FIG. 4, a signal for one frame is represented by a rectangle that is nearly the same as the period of one frame. In addition, six equal portions into which one frame is divided represent six segments of compressed data.

A video signal at frame 0 is sent to the compression code encoder 1. The compression code encoder 1 outputs a compressed signal that has a delay to the input video signal by one frame. The ECC encoder 2 encodes the signal received from the compression code encoder 1 with a product code. The ECC encoder 2 outputs a signal that has a delay to the signal received from the compression code encoder 1 by a time period necessary for the encoding process. The output signal of the ECC encoder 2 is recorded on a tape by a recording head. In addition, the output signal of the ECC encoder 2 is sent as data of the EE system to the ECC decoder 16 of the reproducing system.

On the other hand, a CNF head reproduces a recorded signal that has a delay of the CNF head to a recording head by around 0.5 segments as reproduced data CNF PB RF. The reproduced data CNF PB RF is sent to the ECC decoder 16. The ECC decoder 16 writes two types of data to two different areas of the memory 17.

While the editing operation is being performed, the VTR cannot determine which of the preview operation or the editing operation is being performed until an in-point takes place. Thus, data that has been error-corrected and decompressed in the CNF system is output until an in-point takes place. In FIG. 4, output data of the ECC decoder 16 at frame +2 is reproduced video data of the CNF system. While the editing operation is being performed, the selector 19 selects output data of the compression code decoder 18.

After an in-point takes place, when the VTR determines that the editing operation is being performed, the ECC decoder 16 successively outputs reproduced video data received through the CNF system. On the other hand, when an in-point takes place, if the VTR determines that the preview operation is being performed, the ECC decoder 16 selects data of the EE system received through the compression code encoder 1 and the ECC encoder 2 and outputs the selected data. Output data of the ECC decoder 16 is sent through the compression code decoder 18 and the selector 19. When an out-point takes place. The ECC decoder 16 selects reproduced video data of the CNF system using the PB (CNF PB)/EE selecting function thereof.

The ECC decoder 16 reads data from the memory 17 in such a manner that the phase difference between the reproduced data of the EE system and the reproduced data of the CNF system is absorbed. Thus, in the circuits downstream of the compression code decoder 18 connected to the ECC decoder 16, data is processed in the same timing regardless of the EE system and the CNF system.

Thus, according to the present invention, the user can view video data that has been processed by the compression code encoder 1 and the compression code decoder 18 by the preview operation. Generally, when a video signal is compressed and decompressed, the resultant picture deteriorates. In the editing operation, the same processes are performed. Thus, in the preview operation, the primary objective for allowing the user to check out the edited result can be attained. Consequently, the user can perform the editing operation while viewing a picture reproduced by the CNF head. In addition, the user can check out the deterioration of the picture quality of picture data that has been compressed and decompressed using the EE system regardless of the editing operation.

Figure 5:
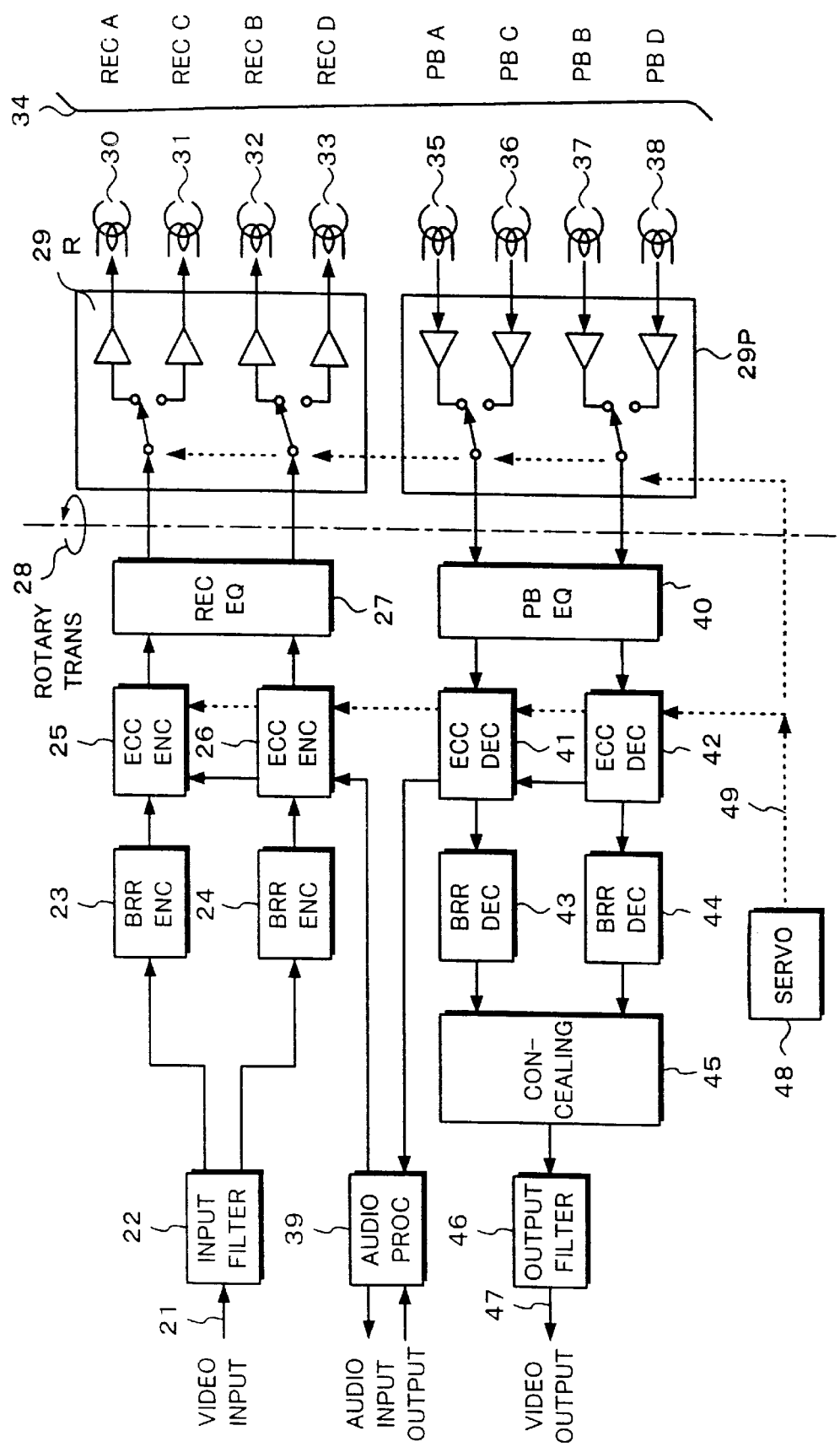
FIG. 5 is a block diagram showing an example of the structure of a recording/producing system of a digital VTR according to the present invention.

Next, the embodiment of the present invention will be described in more detail. For simplicity, a digital VTR according to the present invention will be described. The digital VTR according to the present invention records a high resolution video signal to a magnetic tape and reproduces a high resolution video signal from a magnetic tape. FIG. 5 is a block diagram showing an example of the structure of a recording/reproducing system of the digital VTR. The digital VTR shown in FIG. 5 is a four-head system having four recording heads and four reproducing heads. In the structures shown in FIGS. 3 and 4, for simplicity, a reproducing system including a CNF head (that is a feature of the present invention), an EE system, a selector, and so forth are omitted.

In FIG. 5, a high resolution digital video signal is supplied to an input terminal 21. The digital video signal is sent to an input filter 22. The input filter 22 performs a filtering process for compressing a (4:2:2) signal to a (3:1:1) signal. The input filter 22 changes the clock frequency from 74.25 MHz to 46.40625 MHz.

In addition, the input filter 22 converts the (3:1:1) signal into data of two channels. The data rate of data of each channel is 46.40625 MHz. The data of two channels is sent to BRR (Bit Rate Reduction) encoders 23 and 24 and error correction code encoders (ECC encoders) 25 and 26, respectively. The BRR encoders 23 and 24 perform a compression encoding process. The ECC encoders 25 and 26 perform an error correction code encoding process. The BRR encoders 23 and 24 correspond to the compression code encoder 1 shown in FIG. 3. The ECC encoders 25 and 26 correspond to the ECC encoder 2 shown in FIG. 3.

In this example, the BRR encoders 23 and 24 adaptively selects an intra-field compression encoding process and an intra-frame compression encoding process and shuffle DCT blocks. When a picture does not largely move between fields, DCT blocks are composed of data in a field. On the other hand, when a picture largely moves between fields, DCT blocks are composed of data in a frame. Each of the BRR encoders 23 and 24 switches the process between the intra-field compression encoding process and the intra-frame compression encoding process for each frame as the minimum unit.

The ECC encoders 25 and 26 perform a product code encoding process and generate record data composed of successive sync blocks. The ECC encoders 25 and 26 perform an outer code encoding process, add an ID portion that includes information of the order of sync blocks and various flags to each sync block recorded on the tape, and then perform an inner code encoding process. In this example, the encoding range with the inner code includes the ID portion. One sync block includes the parity of the inner code and a sync signal that represents the beginning thereof. One sync block is the minimum data unit of data that is recorded/reproduced.

Output data of the ECC encoders 25 and 26 are sent to a recording equalizer 27. Record data of two channels received from the recoding equalizer 27 is sent to a recording head driver 29R through a rotary transformer 28. The recording head driver 29R has switching circuits that select recording amplifiers and recording heads. The recoding head driver 29R is connected to recording heads 30, 31, 32, and 33. The recording heads 30 to 33 record data on a magnetic tape 34.

Next, the structure on the reproducing side will be described. Signal recorded on the magnetic tape 34 are reproduced by reproducing heads 35 to 38. Reproduced signals are sent to a reproducing head driver 29P. The reproducing head driver 29P outputs reproduced signals of two channels. The reproduced signals are sent to a reproducing equalizer 40 through the rotary transformer 28. The reproducing equalizer 40 equalizes the reproduced signals and outputs reproduced serial data. In addition, the reproducing equalizer 40 generates a clock signal in synchronization with the reproduced signals and sends the clock signal to ECC decoders 41 and 42 along with the data.

Output signals (reproduced serial data) of two channels of the reproducing equalizer 40 are sent to ECC decoders 41 and 42, respectively. The ECC decoders 41 and 42 detect the synchronization of input data, changes the record rate to the system clock, and correct various errors on the tape. In other words, the ECC decoders 41 and 42 correct an error with an inner code of an error correction code. The inner code is completed in one sync block. When an error can be corrected with an inner code, the ECC decoders 41 and 42 correct the error. Otherwise, the ECC decoders 41 and 42 place an error flag to the position of the error. Next, the ECC decoders 41 and 42 correct an error with an outer code and perform an erasure correcting process with reference to the error flag. Thus, most of the errors are corrected. However, when there is a long error in the longitudinal direction, the ECC decoders 41 and 42 may not correct such an error. At this point, the ECC decoders 41 and 42 detect such an error in the detecting performance of an outer code and set an error flag at the position of the error word.

The ECC decoder 41 and 42 output data and word error flag as each sync block corresponding to the clock signal of 46.40625 MHz. Output data of the ECC decoder 41 and 42 is sent to BRR decoders 43 and 44. The BRR decoders 43 and 44 perform a variable length code decoding process, an inverse DCT transforming process, and a deshuffling process and decode the compressed signal. The BRR decoders 43 and 44 perform an intra-field decoding process/intra-frame decoding process corresponding to the intra-field encoding process/intra-field encoding process performed by the BRR encoders 23 and 24.

Output signals of the BRR decoders 43 and 44 are sent to a concealing circuit 45 along with the error flag for the concealing process. The concealing circuit 45 conceals an error that exceeds the error correcting capability of the ECC decoders 41 and 42. For example, the concealing circuit 45 interpolates in a predetermined manner an error portion that has not been corrected. For example, when the BRR decoders 43 and 44 decompress data, they determine an error of a DCT coefficient corresponding to the word error flag set at the error position. When a DC coefficient or a low order AC coefficient that is a relatively important coefficient has an error, the BRR decoders 43 and 44 do not decode such a DCT block. In this case, the BRR decoders 43 and 44 send the conceal flag to the concealing circuit 45. The concealing circuit 45 interpolates the relevant DCT block.

An output signal of the concealing circuit 45 is sent to an output filter 46. The output filter 46 changes the clock frequency from 46.40625 MHz to 74.25 MHz. In addition, the output filter 46 converts (3:1:1) signals of two channels into a (4:2:2) signal and outputs a reproduced video signal.

Input audio data is sent to an audio processor 39. The audio processor 39 performs a predetermined process and sends the resultant data to the ECC decoders 25 and 26. As with video data, the ECC decoders 25 and 26 encode audio data of each channel with a product code.

The four recording heads 30, 31, 32, and 33 are disposed on the rotating drum that rotates at for example 90 Hz. The pair of the recording heads 30 and 32 are adjacently disposed on the rotating drum. The pair of the recording heads 31 and 33 are adjacently disposed on the rotating drum. The azimuth of the recording head 30 is different from the azimuth of the recording head 32. Likewise, the azimuth of the recording head 31 is different from the azimuth of the recording head 33. The recording heads 30 and 31 are disposed at an interval of 180°. The azimuth of the recording head 30 is the same as the azimuth of the recording head 31. In addition, the reproducing heads 35, 36, 37, and 38 are disposed on the rotating drum. The relation between the positions and azimuths of the reproducing heads 35, 36, 37, and 38 is the same as the relation between the positions and azimuths of the recording heads 30, 31, 32, and 33.

A magnetic tape is wound around the rotating drum at a winding angle of 180°. Data is successively recorded as diagonal tracks on the magnetic tape. The recording head driver 29R has switching circuits that switch record signals in synchronization with the rotation of heads along with recording amplifiers. Likewise, the reproducing head driver 29P has amplifiers and switching circuits. A servo circuit 48 sends switching pulses 49 (represented by dashed lines) in synchronization with the rotation of heads to the switching circuits, the ECC encoders 25 and 26, and the ECC decoders 41 and 42.

Assuming that the recording heads 30, 31, 32, and 33 and the reproducing heads 35, 36, 37, and 38 are denoted by A, B, C, and D as shown in FIG. 5, tracks A and B corresponding to the recording heads A and B are simultaneously formed by the recording heads 30 and 32, respectively. In addition, tracks C and D corresponding to the recording heads C and D are simultaneously formed by the recording heads 31 and 33, respectively. In the embodiment of the present invention, record data of one frame (1/30 seconds) of a video signal is recorded on successive 12 tracks. A segment is composed of adjacent two tracks with different azimuths (a pair of A and B channels and a pair of C and D channels). Thus, one frame of a video signal is composed of six segments. The six segments are designated segment numbers 0 to 5. Audio data of four channels is recorded at a center portion of each track so that the audio data is surrounded by video data.

According to the present invention, the reproducing heads 35 to 38 are normal reproducing ADV heads. Just after the recording heads 30 to 33, a CNF head is disposed.

Figure 6:
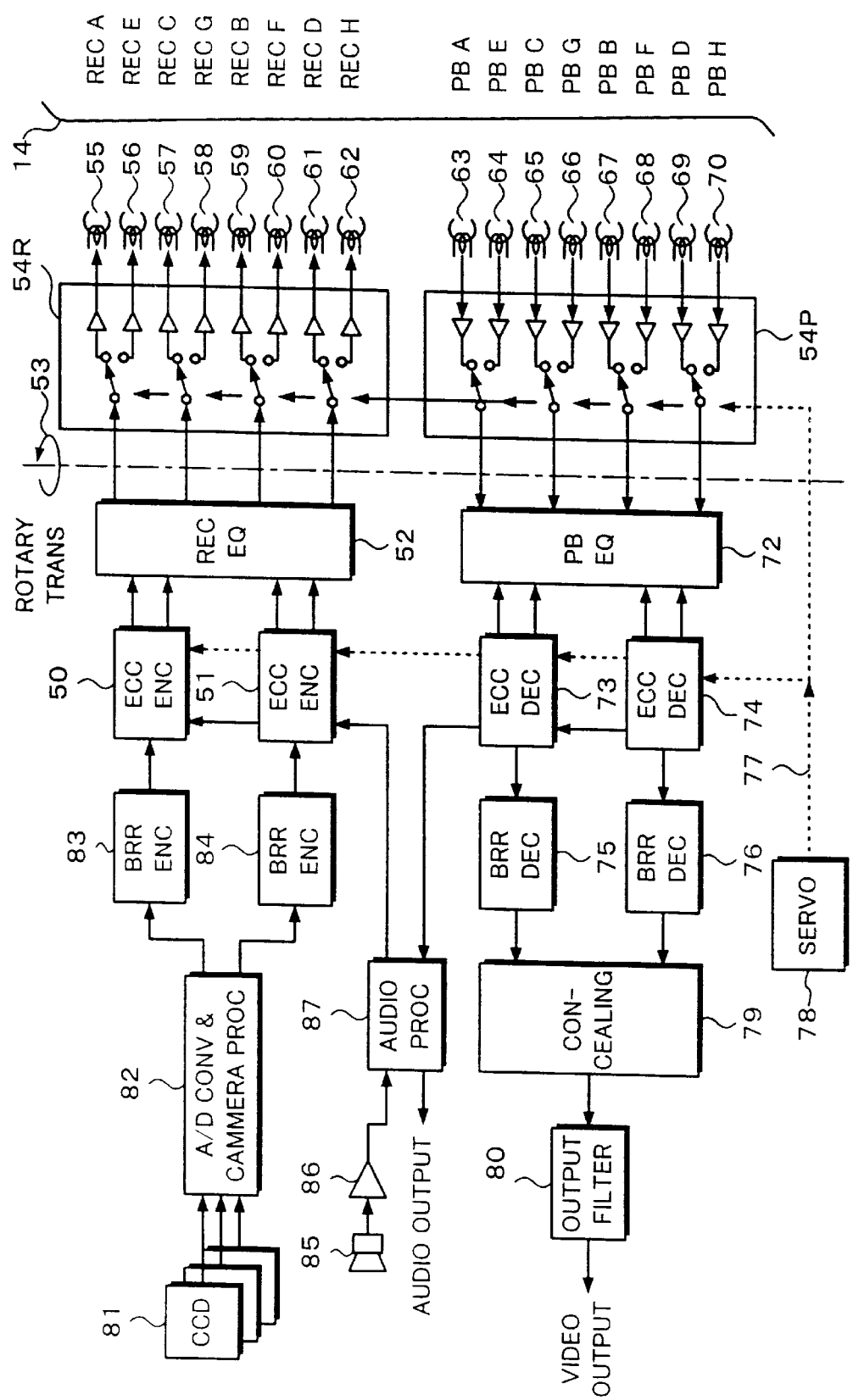
FIG. 6 is a block diagram showing another example of the structure.

FIG. 6 is a block diagram showing another example of the structure of a digital VTR according to the present invention. FIG. 6 shows an eight-head system of which a video camera and a digital VTR are integrally structured and eight recording heads and eight reproducing heads are disposed. A CCD 81 photographs a color picture. An A/D converting and camera coprocessor 82 converts a signal received from the CCD 81 into video signals of two channels. The video signals of two channels are sent to BRR encoders 83 and 84. The BRR encoders 83 and 84 compress the video signals of two channels and send the compressed signals to ECC encoders 50 and 51.

The ECC encoders 50 and 51 divide each channel into two channels and form record data of four channels. The record data of four channels is sent to eight recording heads 55, 56, 57, 58, 59, 60, 61, and 62 through a recording equalizer 52, a rotary transformer 53, and a recording head driver 54R. The recording heads 55, 56, 57, 58, 59, 60, 61, and 62 record the data of four channels as diagonal tracks to a magnetic tape 34.

As with the recording heads, reproducing heads 63, 64, 65, 66, 67, 68, 69, and 70 are disposed. Output signals of the reproducing heads are sent to a reproducing head driver 54P. The reproducing head driver 54P outputs reproduced signals of four channels. The reproduced signals of four channels are sent to a reproducing equalizer 72 through the rotary transformer 53. Output signals of the reproducing equalizer 72 are sent to ECC decoders 73 and 74. The ECC decoders 73 and 74 correct errors of the signals received from the reproducing equalizer 72. The ECC decoders 73 and 74 output reproduced data of two channels to BRR decoders 75 and 76. The BRR decoders 75 and 76 decode the data of two channels received from the ECC decoders 73 and 74.

Switching pulses 77 received from a servo circuit 78 are sent to the ECC encoders 50 and 51, the ECC decoders 73 and 74, the recording head driver 54R, and the reproducing head drivers 54P. The switching pulses 77 cause the ECC encoders 50 and 51, the ECC decoders 73 and 74, the recording head driver 54R, and the reproducing head driver 54P to synchronize with the rotation of the heads.

The BRR decoders 75 and 76 send decompressed data to a concealing circuit 79. The concealing circuit 79 interpolates an error that has not been corrected. Output data of the concealing circuit 79 is sent to an output filter 80. The output filter 80 converts a (3:1:1) signal into a (4:2:2) signal and sends the resultant signal as an output video signal.

In the structure shown in FIG. 6, eight recording heads and eight reproducing heads are used. Thus, the number of recording heads and the number of reproducing heads in the structure shown in FIG. 6 are twice those in the structure shown in FIG. 5. In the structure shown in FIG. 6, the rotation of the drum is half of that of the four-head system shown in FIG. 5 so as to suppress the noise of the drum. The azimuth of each of the four recording heads 55, 56, 57, and 58 shown in FIG. 6 is the same. Likewise, the azimuth of each of the four recording heads 59, 60, 61, and 62 is the same. The azimuth of each of the four recording heads 55, 56, 57, and 58 is the reverse of the azimuth of each of the four recording heads 59, 60, 61, and 62. The recording heads 55(A) and 56(E) are disposed on the rotating drum at an interval of 180°. The recording heads 57(C) and 58(G) are disposed on the rotating drum at an interval of 180°. The recording heads 59(B) and 60(F) are disposed on the rotating drum at an interval of 180°. The recording heads 61(D) and 62(H) are disposed on the rotating drum at an interval of 180°.

The recording heads 55, 57, 59, and 61 trace the magnetic tape 34 nearly at the same time. Thereafter, the recording heads 56, 58, 60, and 62 trace the magnetic tape nearly at the same time. Since the rotation of the drum is halved and the number of the heads is doubled in comparison with the structure shown in FIG. 5, the same track pattern as that of the four-head system is formed on the magnetic tape. Since four tracks are recorded at the same time, record signals of four channels are sent to the rotary transformer 53. Opposite heads are selected corresponding to the switching pulses 77 received from the servo circuit 78. The reproducing heads 63, 64, 65, 66, 67, 68, 69, and 70 have the same relation as the recording heads 55, 56, 57, 58, 59, 60, 61, and 62.

In the eight-head system shown in FIG. 6, the number of channels of the reproduced signals is four that are twice that of the four-head system shown in FIG. 5. However, since the data rate of the eight-head system is half of that of the four-head system shown in FIG. 5, when input stages for the four channels are added, the structure shown in FIG. 6 can be accomplished by the structure shown in FIG. 5. In addition, the reverse azimuth can be accomplished by the same circuit as the four-head system shown in FIG. 5. Thus, the ECC decoders 41 and 42 (see FIG. 5) and the ECC decoders 73 and 74 can be accomplished by the same IC. The present invention can be applied to each of the four-head type digital VTR (see FIG. 5) and the eight-head type digital VTR (see FIG. 6). In the following description, the four-head type digital VTR according to the present invention will be described.

Figure 7:
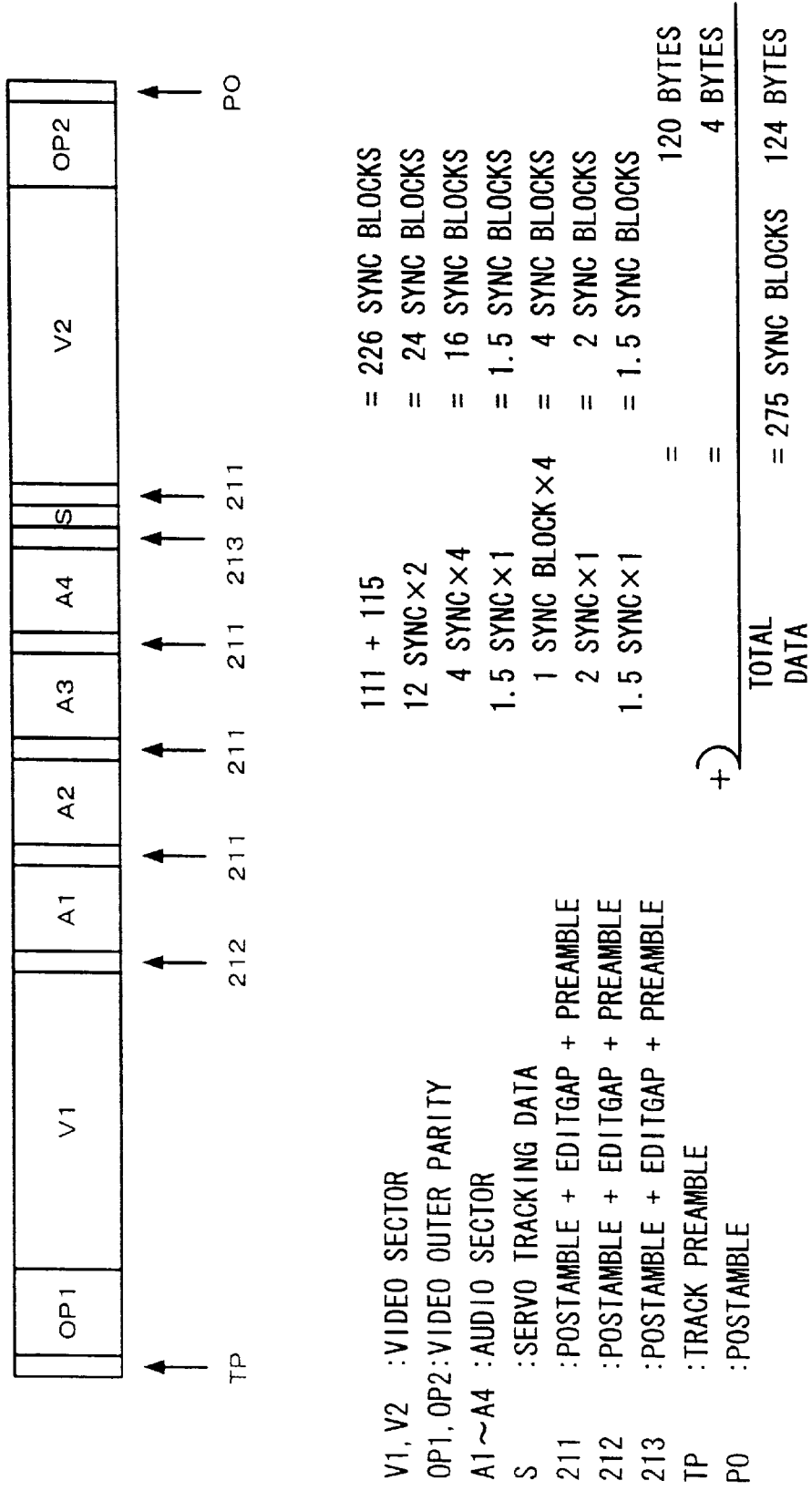
FIG. 7 is a schematic diagram showing an example of the data format of one track.

FIG. 7 shows the format of one track formed on a magnetic tape. On the track, data is arranged in the head tracing direction. One track has video sectors v1 and v2 and audio sectors A1 to A4. Each of video data and audio data recorded on one track is encoded with a product code. In FIG. 7, OP1 and OP2 represent parities of outer codes in the case that video data is encoded with a product code. A parity of an outer code in the case that audio data is encoded with a product code is recorded in an audio sector. Each track is equally divided into 233 bytes. Each of the 233 bytes is referred to as sync block.

FIG. 7 shows the length of each portion of one track. In this example, data of 275 sync blocks and 124 bytes is recorded on one track. The video sectors are composed of 226 sync blocks. The time period of one track is around 5.6 ms. A no-record portion is formed at a gap between each sector. This gap is referred to as edit gap. The edit gap is formed so as to prevent a sector that is recorded from erasing an adjacent sector.

Figure 8A:
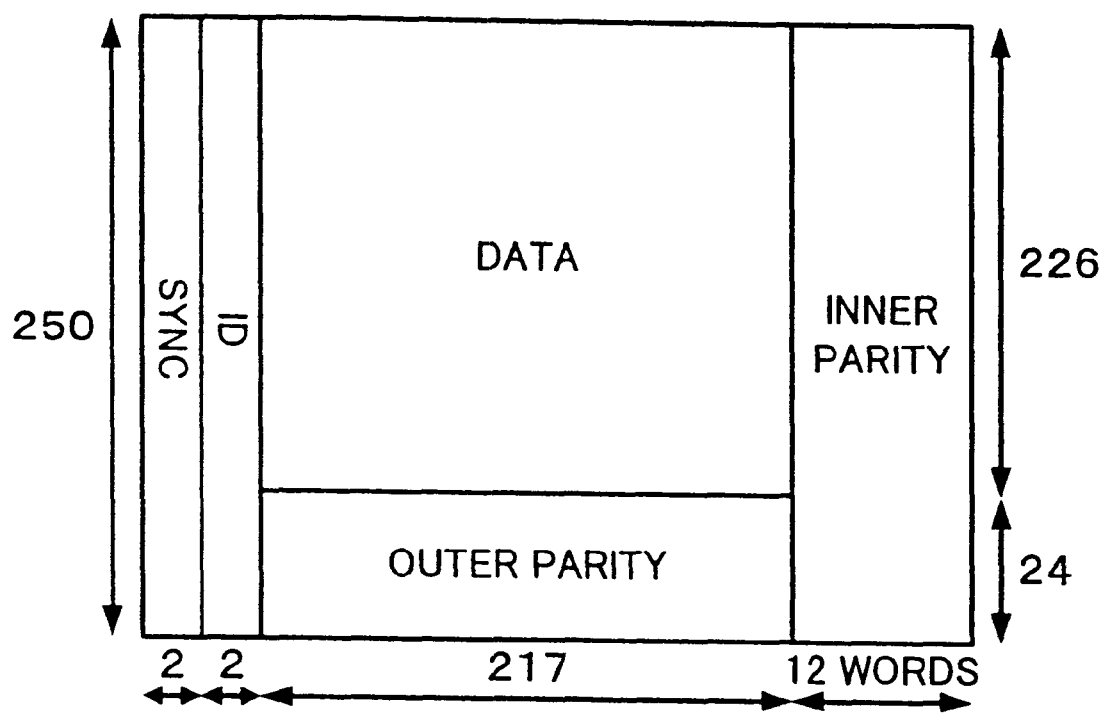
FIGS. 8A and 8B are schematic diagrams for explaining an error correction code and a sync block.

FIG. 8A shows an example of the structure of an error correction code used for video data. Video data for each track is encoded with an error correction code. In other words, video data for one track is arranged as an array of (217×226). The vertical 226 words of the array are encoded with a (250, 226) Reed-Solomon code (outer code). Thus, a parity of an outer code of 24 words is added. With the outer code, an error of up to 10 words can be corrected. In addition, an error of up to 24 words can be erasure-corrected.

An ID of two words is added to 217 words (video data or the parity of the outer code) arranged in the horizontal direction of the two-dimensional array. The (217+2=219) words arranged in the horizontal direction are encoded with a (231, 219) Reed-Solomon code (inner code). Thus, a parity of an inner code of 12 words is generated. With the inner code, an error of up to four words is corrected. In addition, an erasure flag for correcting an error with the outer code is generated.

As with the video data, audio data is encoded with a product code. However, the data amount of audio data recorded on one track is different from the data amount of video data recorded on one track.

Figure 8B:
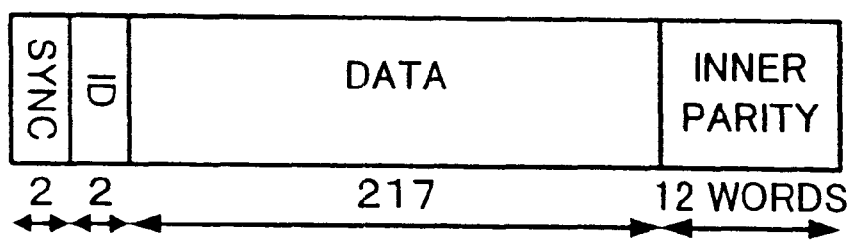

In other words, data is encoded with an outer code. The resultant data including an ID is encoded with an inner code. Data is extracted in the encoding direction of the inner code. A block sync is added to the resultant data. Thus, as shown in FIG. 8B, one sync block composed of 233 bytes is formed. In other words, a block sync of two words is added to (2+217+12=231) words of each line of the array shown in FIG. 8A. Successive sync blocks are scrambled and then recorded on the magnetic tape.

After the sync pattern, an ID of two bytes (ID0 and ID1) is inserted into each sync block. ID0 represents a sync block number. Sync blocks on one track can be identified with sync block numbers. ID1 includes a flag that distinguishes an audio sector/video sector, a track number that distinguishes an adjacent track with a different azimuth, and a segment number 0 to 5. In addition, ID1 includes flags of compression encoding parameters (intra-frame encoding/intra-field encoding, high quality/standard quality, and shuffling pattern).

The first words (HD) of 217 words of each sync block represents a data header. The data header includes information representing a quantizing characteristic of data and a sync error flag of one bit.

Figure 9:
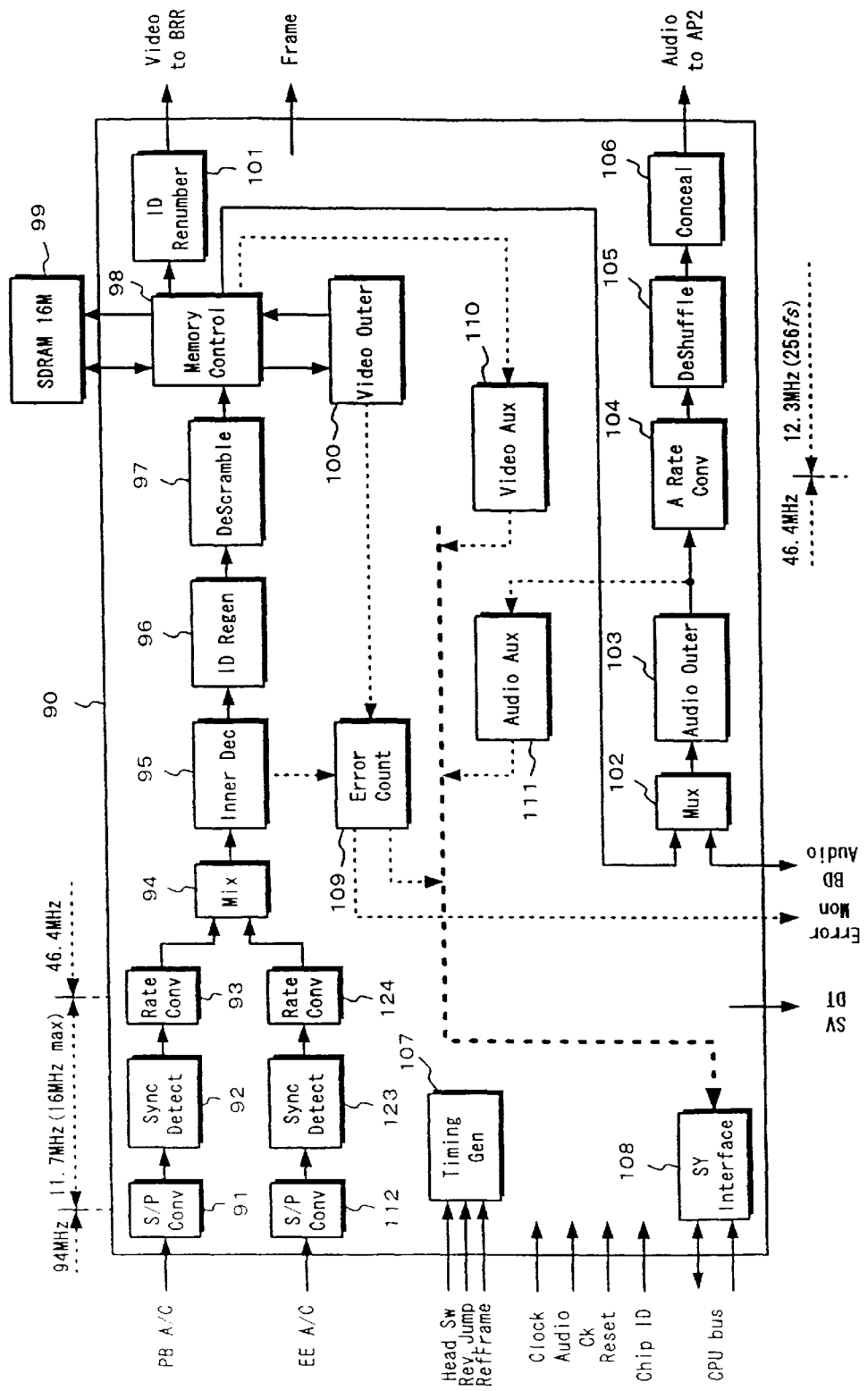
FIG. 9 is a block diagram showing the internal structure of an error correction decoder IC.

Next, with reference to FIG. 9, the structure of the ECC decoder 41 or 42 will be described in detail. The ECC decoder 73 (or 74) of the eight-head system is the same as the structure shown in FIG. 9 except that the number of input stages is doubled. In FIG. 9, reference numeral 90 is an ECC decoder IC. The ECC decoder IC 90 has an inner code error correcting function, an outer code error correcting function, an audio signal processing function, an error counting function, and an auxiliary data reading function as basic functions.

Serial data reproduced at a record rate of 94 Mbps and a clock signal generated therewith are sent in parallel to an S/P converter 91 of the ECC decoder IC 90. The SIP converter 91 outputs data of eight bits wide and a ⅛-frequency clock signal.

In this stage, high speed data of one bit wide is converted into low speed data of eight bits wide at a data rate of 11 Mbps. Thus, data can be properly divided at each byte or sync block. With the synchronization detecting function of a synchronization detecting circuit 92, the low speed data is converted into a regular data sequence. The end of each byte is defined as a bit assignment of an output terminal of the synchronization detecting circuit 92. The end of each sync block is defined as a strobe pulse added by the synchronization detecting circuit 92. A rate converter 92 changes the data rate of the signal to a frequency of 46 MHz of the system clock.

As with the above-described circuit structure for the PB system, the similar structure is disposed for an input signal of the EE system. As described above, the input signal to the EE system is required for a signal process for a cam-corder (eight-head system). As with the PB system, to process reproduced data of the EE system, an S/P converter 112, a synchronization detecting circuit 113, and a rate converter 114 are disposed. Data packets that are output from these circuits are mixed to one channel by an OR circuit of a mixer 94. The data rate of the input signal is converted from 11 Mbps to 46 Mbps. Thus, since a gap takes place between each packet, data of the EE system and data of the PB system can be mixed. However, when they are unconditionally mixed, they collide. Thus, the rate converters 93 and 114 start/stop outputting signals corresponding to a busy state of the other rate converter. To identify a source of a packet, a flag EE/PB of one bit is placed in the packet.

A head switch signal is delayed by a timing generator 107 for a delay time period of the internal circuit. Likewise, information that represents the tape traveling direction is delayed. The rate converters 93 and 114 place such information in each packet. The rate converters 93 and 114 determine whether or not a no-data record region (referred to as gap) takes place using a counter that is initialized whenever a head is switched and that operates with strobe pulses. The rate converters 93 and 114 place the resultant information in each packet.

An inner code decoder 95 corrects an error of a packet received from the mixer 94 with an inner code. Output data of the inner code decoder 95 contains error correction information. The output data of the inner code decoder 95 is sent to an ID restoring circuit 96. When the inner code decoder 95 cannot correct an error with the inner code, since the ID of the packet is incorrect, it cannot be used. However, since a memory controller 98 determines an outer code correction sequence and order with reference to an ID, it should be restored. The ID restoring circuit 96 restores an ID of a packet that cannot be corrected using IDs of adjacent packets whose errors can be corrected. The ID restoring circuit 96 has a RAM that stores three packets for each of the PB system and the EE system. With the RAMs, data is converted into parallel data of 16 bits wide. In addition, the ID restoring circuit 96 performs the start-stop control to the video outer code decoder 100.

Output data of the ID restoring circuit 96 is. sent to a descrambling circuit 97. The descrambling circuit 97 descrambles the signal received from the ID restoring circuit 96. Output data of the descrambling circuit 97 is sent to an external SDRAM (Synchronous Dynamic Random Access Memory) 99 through a memory controller 98.

At this point, the memory controller 98 controls timing of data received from the descrambling circuit 97. In addition, the memory controller 98 controls addresses of the SDRAM 99 for each segment of video data and audio data.

When video data of the PB system is stored for one error correction code block (one track), the memory controller 98 performs a read controlling operation for the SDRAM 99, reads data in the direction of the outer code from the DRAM 99, and sends the resultant data to the video outer code decoder 100 so that the video outer code decoder 100 performs the outer code correcting process. The memory controller 98 writes data that has been decoded with the outer code to the SDRAM 99.

The memory controller 98 selects PB/EE data for data that has been decoded with the outer code for one track, reads data in the direction of the inner code, and sends the data to an ID renumbering circuit 101. The phase of data that is read from the SDRAM 99 for the PB system is the same as the phase of that for the EE system. The ID renumbering circuit 101 renumbers an ID so as to interface with the compression decoder.

On the other hand, when audio data for one field (one error correction code encoding unit of audio data) is stored in the SDRAM 99, the data is sent to a multiplexer 102. The multiplexer 102 multiplexes the audio data with audio data received from the ECC decoder that processes another azimuth track. The resultant data is sent to an audio outer code decoder 103. The audio outer code decoder 103 corrects an error of the data received from the multiplexer 102 with an outer code. A rate converter 104 converts the clock frequency from 46.4 MHz to 12.3 MHz (256 fs) for audio data. A deshuffling circuit 105 deshuffles the data received from the rate converter 104 and performs a time axis expanding process. A concealing circuit 106 interpolates an error of the data received from the deshuffling circuit 105. The resultant signal is output as serial data from the IC.

In addition, an interface 108 with a system controlling microcomputer (referred to as system controller) is disposed. The system controller designates various data and reads error information. Moreover, an auxiliary video data extracting circuit 110 and an auxiliary audio data extracting circuit 111 are disposed. The auxiliary video data extracting circuit 110 extracts auxiliary video data other than video data. The auxiliary audio data extracting circuit 111 extracts auxiliary audio data other than audio data. The extracted auxiliary data is sent to the system controller through the interface 108. In addition, an error counter 109 that counts errors is disposed.

Figure 10:
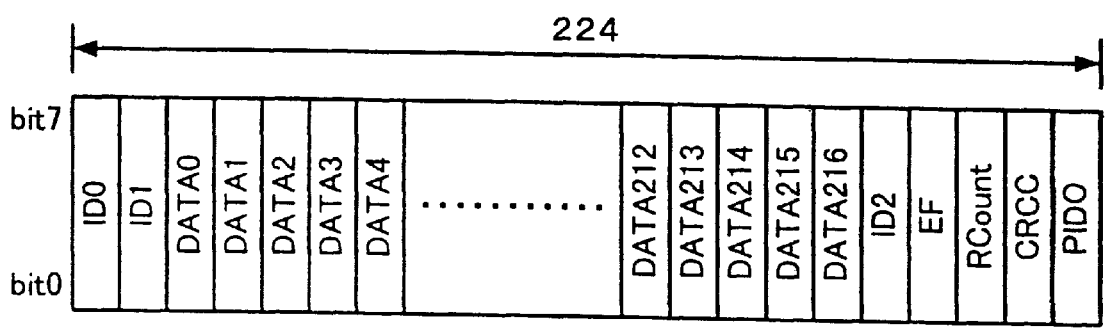
FIG. 10 is a schematic diagram showing an example of the internal data format of the error correction code decoder IC.

In the decoder IC 90, one sync block is treated as one packet unit. FIG. 10 shows the data format of one sync block handled by the decoder IC 90. Next, the data format will be described. Each sync block is designated a sync block number with which the ECC IC 90 identifies the sync block. ID0 includes a sync block number. ID1 includes a segment number, a flag for identifying a video sector/audio sector, and so forth. Data 0 to 216 include video data. ID2 includes auxiliary information that represents the traveling direction of a tape. EF includes information of an error of each sync block. RCount includes information representing how many times video data has been output without an update of data due to an error. CRCC is an error detection code. PID0 includes a sync block number predicted with a head switching pulse.

Figure 11:
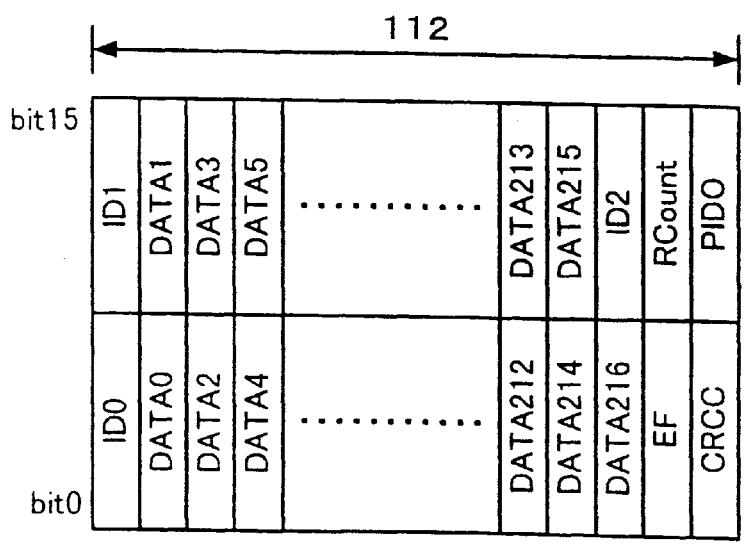
FIG. 11 is a schematic diagram showing an example of the read/write data format of an external RAM connected to the error correction code decoder IC.

FIG. 11 shows the format of one sync block that is stored in the SDRAM 99. Since the data width of the SDRAM 99 is 16 bits, each of the read data width and write data width of the SDRAM 99 is 16 bits. The bit width of the internal data format shown in FIG. 10 is eight bits, whereas the data width is 16 bits. Thus, the number of words of one sync block of the format shown in FIG. 11 is 112 words that are half of that of the format shown in FIG. 10.

Figure 12:
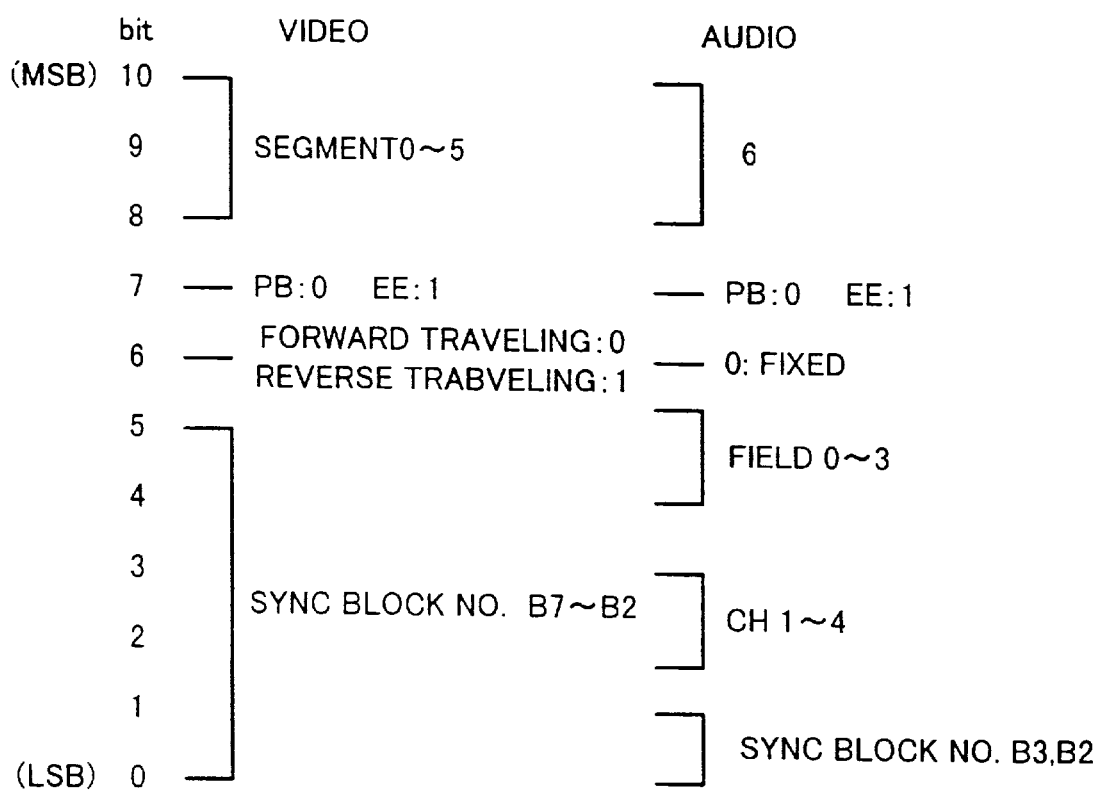
FIG. 12 is a schematic diagram showing an example of row addresses assigned to the external RAM connected to the error correction code decoder IC.

FIGS. 12 and 13 are schematic diagrams showing addresses assigned in the SDRAM 99. The addresses of the SDRAM 99 are categorized as row addresses and column addresses. FIG. 12 shows row addresses assigned for video data and audio data. Bits 10 to 8 of the row addresses are assigned segments 0 to 5 for video data and segment 6 for audio data so that video data does not collide with audio data in row addresses.

Bit 7 of the row addresses of the SDRAM 99 is assigned PB data or EE data. Bit 6 of the row addresses is assigned a tape traveling direction (forward traveling=1; reverse traveling=0). Bits 5 to 0 of the row addresses of the SDRAM 99 are assigned bits 7 to 2 of sync block numbers (B7 to B2) for video data.

Bit 6 of the row addresses of the SDRAM 99 is assigned 0 (fixed) for audio data. Bits 5 and 4 of the row addresses of the SDRAM 99 are assigned fields 0 to 3 for audio data (this is because one error correction unit for audio data is one field). Bits 3 and 2 of the low addresses of the SDRAM 99 are assigned audio channels for audio data. Bits 2 and 1 of the addresses of the SDRAM 99 are assigned bits 3 and 2 of sync block numbers (B3 and B2) for audio data.

FIG. 13 shows the column addresses of the SDRAM 99. The column addresses of the SDRAM 99 are assigned for video data and audio data in such a manner that bits 1 and 0 of sync block numbers have data of four sync blocks 0, 1, 2, and 3. Data is assigned to two banks A and B. S0, S1, S2, and S3 shown in FIG. 13 represent that bits 1 and 0 (B1 and B0) of sync block numbers are sync blocks 0, 1, 2, and 3, respectively. Addresses 224 to 251 of banks A and B shown in FIG. 13 are assigned Err0 to Err216. These addresses are used to store error flags generated by an outer code error correcting process. One error flag is assigned one bit. One word stores 16 error flags. Data of four sync blocks is mixed and addresses are complicatedly assigned so as to perform read/write operations at high speed.

Such address assignment and data format for both row addresses and column addresses do not change in data that has been decoded with an inner code and an outer code.

FIG. 14 is a timing chart showing an accessing process to the SDRAM 99 for the preview operation and the editing operation. One frame is composed of six segments. Segments 0 to 5 are RAM areas corresponding to segments of video data. The RAM areas are divided for the PB system and the EE system. Video data of the PB system and video data of the EE system are independently processed at the same time. However, when video data is read and output, one of the PB system and the EE system is selected and processed. Since the internal clock rate is sufficiently high, the processes for the PB system and the EE system are performed at the same time on time division basis. An outer code error correcting process is not performed for the EE system. This is because the video data does not have errors. As shown in FIG. 14, the phase of input data of the PB system is different from the phase of input data of the EE system. However, the phase of output data of the PB system is matched with the phase of output data of the EE system.

The RAM accessing process for the PB system and the EE system is performed on time division basis as shown in FIG. 15. As shown in FIG. 15, every 1008 clock pulses, the RAM accessing process is switched between the PB system and the EE system. Since each process is assigned the time period of 1008 clock pulses, the number of clock pulses varies in each process.

In the above description, the present invention was applied to the 1125 line/60 Hz system. However, the present invention is not limited to such a system. For example, the present invention can be easily applied to the NTSC system whose field frequency is 59.94 Hz. In this case, the frequencies of each interface signal and clock signal are divided by 1.001 (=60/59.94).

In addition, the present invention is applied to a recording/reproducing operation only for a video signal or an audio signal.

The present invention has the following effects.

In the preview operation, after an edit point (in-point), a compressed picture can be output. A compressed picture is actually recorded. Thus, according to the present invention, the primary objective of the preview operation that allows the user to check out the edited result can be attained. In addition, according to the present invention, since a bypass signal path is disposed, regardless of the editing operation, the user can check out the deterioration of a picture that is compressed.

Just before an in-point takes place, the VTR cannot determine which of the preview operation or the editing operation is being performed. However, according to the present invention, the VTR continuously outputs a reproduced picture of a CNF head until the in-point takes place. At an in-point, when the VTR determines that the editing operation is being performed, the VTR continuously outputs a reproduced picture of the CNF head. Thus, the user can view a recorded picture that is being edited.

When an ECC decoder has two input systems that are a main input system and a sub input system, a bypass signal and a reproduced signal can be supplied to the ECC decoder using these input systems. Thus, since the number of pins of IC chips is not increased, the cost of the apparatus can be decreased.

In addition, an ECC decoder writes a reproduced signal and a bypass signal to different areas of a memory connected thereto. The ECC decoder selectively reads one of the reproduced signal and the bypass signal. Since the phases of the reproduced signal and the bypass signal are matched, an output signal can be switched between the bypass signal and the reproduced signal without a deviation of the phase of a picture at an in-point. In addition, only one RAM connected to the ECC decoder is required. Thus, the cost of the apparatus can be decreased. Moreover, since the reproduced signal and the bypass signal with the same phase are output from the ECC decoder, processes downstream of the ECC decoder can be performed in the same phase. Thus, the circuits and processes can be simplified.

What is claimed is:

1. Digital signal recording/reproducing apparatus for recording a digital sigal and reproducing a digital signal from a record medium, comprising:
   a recording path including:
      a compression code encoder for compressing an input digital signal, and
      an error correction code (ECC) encoder for ECC encoding the signal compressed by said compression code encoder;
      a recording unit for recording on said record medium the ECC encoded compressed signal received via said recording signal path; and
      a reproducing unit for reproducing a signal from said record medium; a reproducing path including:
      an error corrector for receiving a reproduced ECC encoded compressed signal from said reproducing unit and ECC decoding the reproduced signal, and
      a compression code decoder signal for receiving and decompressing the ECC decoded signal from said error corrector;
      a bypass signal path connected from an output of said ECC encoder in said recording path to an input of said error corrector; and
      a selector for selecting a decompressed ECC decoded signal derived from said reproducing path or from said bypass signal path.

2. The digital signal recording/reproducing apparatus as set forth in claim 1 wherein said error corrector includes an input coupled to said reproducing unit, and an input coupled to said bypass signal path.

3. The digital signal recording/reproducing apparatus as set forth in claim 2, wherein said error corrector includes a memory, and wherein the signal reproduced by said reproducing unit and the signal supplied by said bypass signal path are assigned to and stored in different addresses of said memory.

4. The digital signal recording/reproducing apparatus as set forth in claim 3, wherein the signal reproduced by said reproducing unit or the signal supplied by the bypass signal path is selectively read from said memory, and wherein the phase of the stored signal from the reproducing unit is matched with the phase of the stored signal from the bypass signal path so that the phase difference therebetween is reduced to zero.

5. A method of recording a digital signal on and reproducing a digital signal from a record medium comprising the steps of:

compressing an input digital signal;

ECC encoding the compressed digital signal;

recording the ECC encoded signal on the record medium;

reproducing a signal from the record medium;

ECC decoding the signal produced from the record medium;

decompressing the ECC decoded signal;

providing the ECC encoded signal for ECC decoding while bypassing the record medium; and selecting the ECC decoded signal derived either from the record medium or bypassed from the record medium.

6. The method of claim 5, wherein the step of ECC decoding further includes the step of storing in different sections of a memory, a compressed digital signal reproduced from the record medium and a compressed digital signal that has bypassed the record medium.

7. The method of claim 5, wherein the stored signal reproduced from the record medium or the stored signal that bypassed the record medium is selectively read from the memory; and wherein the phase of the stored signal reproduced from the record medium is matched to the phase of the stored signal that bypassed the record medium so that the phase difference therebetween is reduced to zero.

\* \* \* \* \*